Sept. 5, 1967 A. W. VASEL 3,340,519
SMOKE DETECTION APPARATUS
Original Filed Jan. 14, 1963 2 Sheets-Sheet 1

INVENTOR
Alfred W. Vasel
By his Attorney
Robert E. Ross

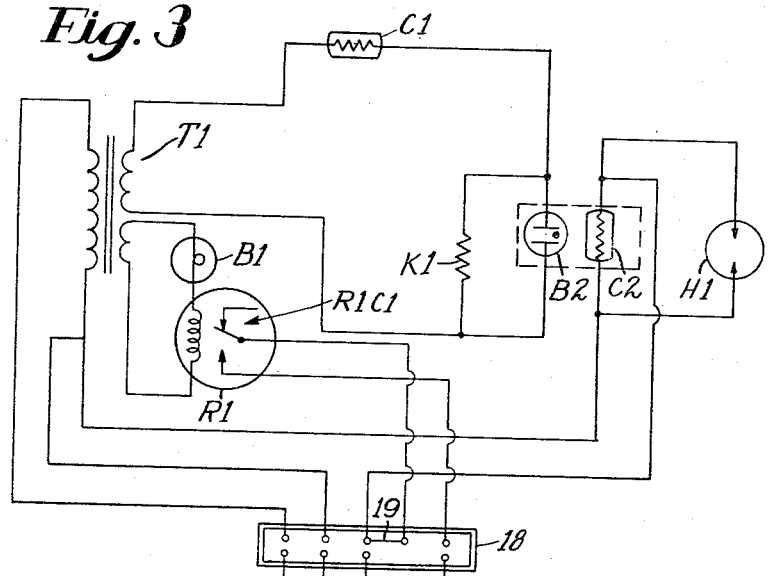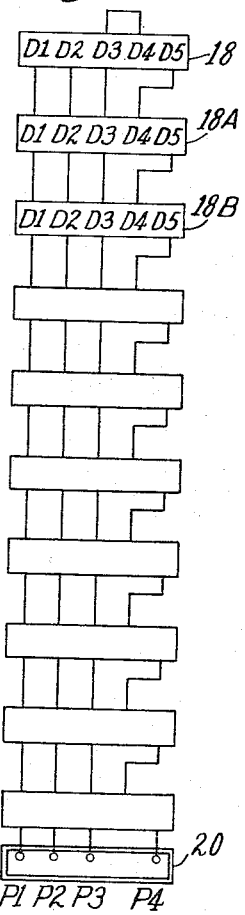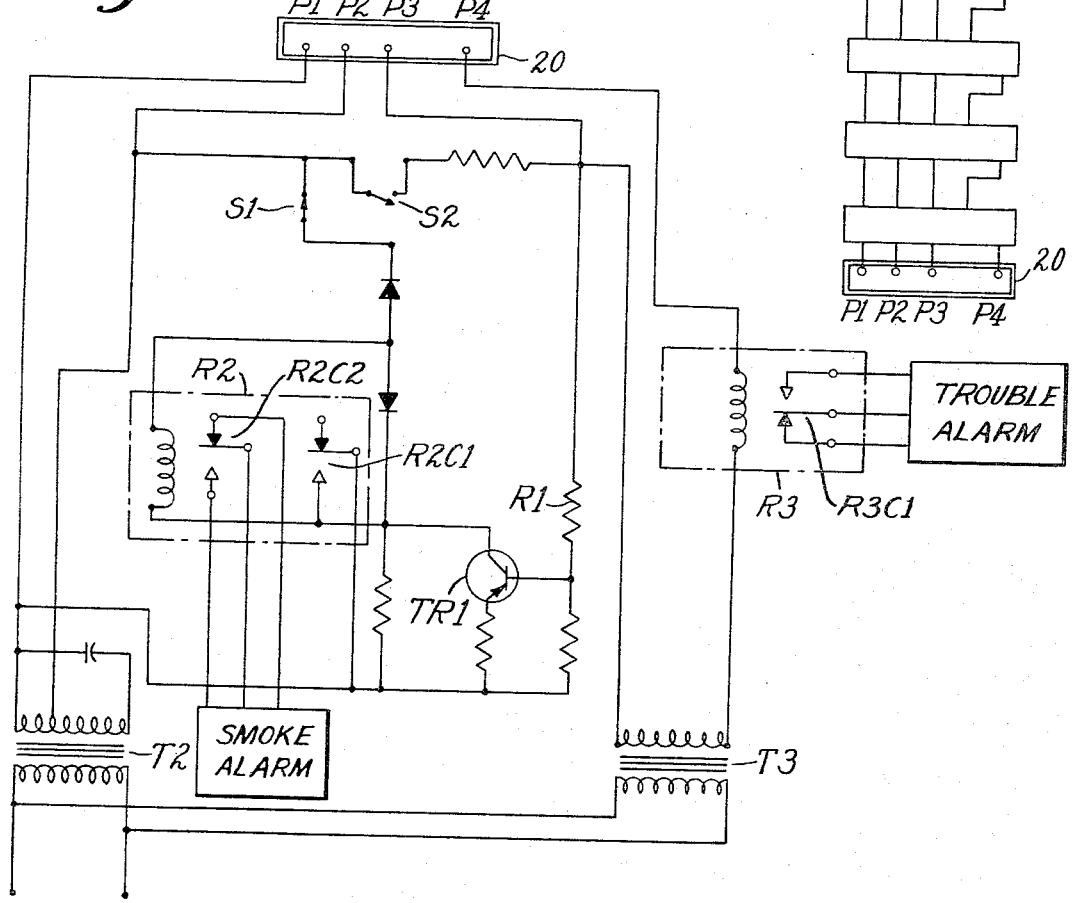

United States Patent Office 3,340,519
Patented Sept. 5, 1967

3,340,519
SMOKE DETECTION APPARATUS
Alfred W. Vasel, 222 Linwood St.,
Abington, Mass. 02351
Continuation of application Ser. No. 251,095, Jan. 14, 1963. This application Nov. 22, 1965, Ser. No. 539,226
3 Claims. (Cl. 340—237)

This application is a continuation of application Ser. No. 251,095, filed Jan. 14, 1963, now abandoned.

This invention relates generally to detection apparatus, and has particular reference to fire and smoke detection apparatus.

In my copending application Ser. No. 396,692, filed Sept. 15, 1964, a continuation of now abandoned application Ser. No. 94,532, filed Mar. 9, 1961, there is disclosed a detector unit adapted to detect the presence of smoke particles, comprising a housing having a light source and a detector cell, so arranged therein that when smoke particles are present in the housing, light from the light source is diffused from the smoke particles onto the cell, thereby lowering its electrical resistance and actuating an alarm circuit.

A typical industrial installation will comprise a number of detector units in an area under surveillance, connected to a common central control panel. It has been customary to protect the wiring between the panel and the control units from accidental damage by enclosing it in conduit, which considerably adds to the cost of the installation. Even when so protected, the wires are nevertheless occasionally broken or shorted. Such an installation also requires frequent inspection of the small light bulbs in each unit that provides the alarm actuating light source, which adds to the cost of maintaining the system.

It is also desirable to provide means for monitoring the continuity of the leads to the detector cell, which is made difficult by the fact that the cell resistance, under conditions of no smoke, has a resistance of the order of between about 50 and 100 megohms. To detect the difference between a resistance of this magnitude and an open circuit requires highly accurate and complicated test equipment which would greatly increase the cost and decrease the reliability of the monitor unit.

The object of this invention is to provide a detection system of the type described in which means is provided to reliably monitor the condition of the detector unit and the wiring extending thereto, so that the necessity of enclosing the wiring in protective conduit is eliminated.

A further object of the invention is to provide a detection system of the type described in which means is provided to monitor the wiring to the light source, the operativeness of the light source, and the wiring to the detector cell, without the use of additional wiring over that required for the power source and the detector element.

Other objects of the invention will be apparent to one skilled in the art from the following detailed description of a specific embodiment thereof.

In the drawing,

FIG. 3 is a schematic view of the circuit of the detector unit of FIGS. 1 and 2 connected to a central control panel; and FIG. 4 is a schematic view of a central control panel;

FIG. 5 is a schematic view illustrating the manner of connecting a plurality of detector units to the central control panel.

Figure 1:
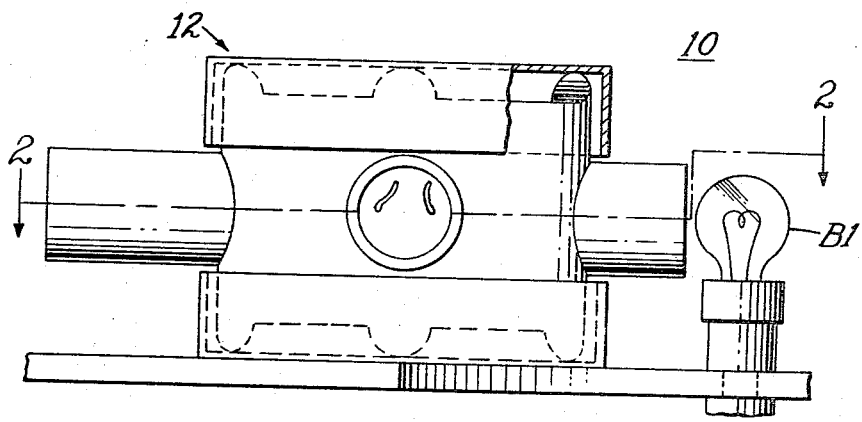
FIG. 1 is a view in side elevation of a detector unit.
Figure 2:
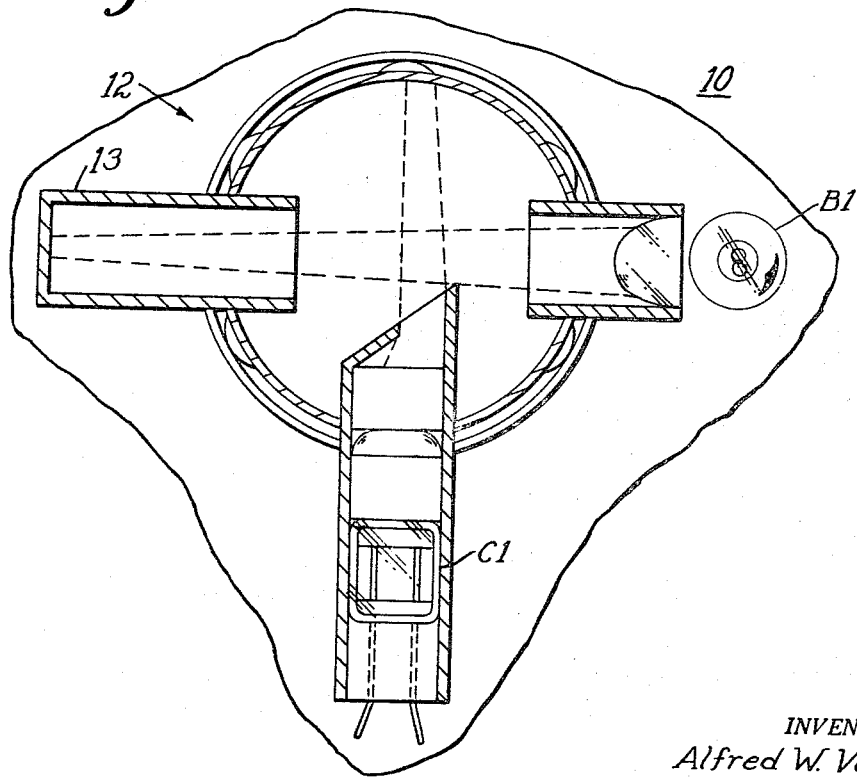
FIG. 2 is a view in section taken on line 2—2 of FIG. 1.

Referring to FIGS. 1 and 2 of the drawing, there is illustrated a smoke detector unit 10, which comprises generally a housing 12 having apertures permitting the ambient atmosphere to flow or diffuse through the housing. A light source B1 is positioned to project light across the housing into a light trap 13 and a photo-resistive cell C1 views the medial portion of the light beam, so that it receives light diffused from smoke particles present in the housing, but is shielded from the direct view of the light source. The detector unit also includes certain electrical components, now to be described, illustrated schematically in FIG. 3. Power for the light source B1 is provided by a transformer T1, one secondary portion of which is connected to the light source B1 through the coil of a trouble relay R1 having normally open contacts R1C1 which are closed when the relay R1 is energized. The contacts R1C1 are connected to terminals D4 and D5 on terminal strip 18 for connection to an external circuit leading to the master control panel to be described hereinafter. Another secondary portion of transformer T1 is connected to a neon bulb B2 through the detector cell C1. Disposed adjacent the neon bulb B2 is a second photo-resistive cell C2, positioned to receive light therefrom when bulb B2 is lit, and responsive thereto by a decrease in resistance. The cell C2 is connected to terminals D2 and D3 on terminal strip 18 for connection to an external circuit to be described. A heat sensitive element H1 may be connected in parallel with cell C2 if appropriate for the particular installation. The primary of transformer T1 is connected to terminals D1 and D2 of terminal strip 18 and therefore one lead of the transformer is common with one side of the cell C2.

If only a single detector unit is to be used, terminals D3 and D4 may be connected by a jumper wire 19 so that the relay contacts R1C1 and the cell C2 are in series for a purpose to appear hereinafter, however in a typical installation, a plurality of detector units are used. In such case, the units may be connected to each other and to a terminal strip 20 of a central control panel in the manner shown in FIG. 5 so that all transformer T1 primaries are in parallel across terminals P1 and P2 of the control panel, and all relays R1 are in series across terminals P3 and P4 of the control panel.

The operation of the detector unit is as follows: The cell C1 normally has a resistance of about 50 megohms which is too high to permit transformer T1 to energize the neon bulb B2. To establish a predetermined resistance value of cell C1 which will energize the bulb B1, a calibrating resistor K1 may be connected in parallel with the bulb B2. However, when smoke is present in the housing, light from the bulb B1 is diffused by the smoke onto the cell C1 thereby causing its resistance to drop. If sufficient smoke is present in the housing, the resistance of the cell C1 drops to a value such that sufficient voltage appears across neon bulb B2 and resistor K1 to cause said bulb to light. The resistance of cell C2 thereby drops in response to the light from bulb B2, to provide a conductive path between terminals D2 and D3 to actuate an alarm device in a manner to appear hereinafter.

Referring again to FIG. 4, the control unit comprises a transformer T2, the secondary of which is connected to terminals P1 and P2 of the control panel to provide power to the transformers T1 of the detector units, a transformer T3, the secondary of which is connected to terminals P3 and P4 through the coil of a trouble alarm relay R3, and a relay R2 adapted to be energized when a detector unit responds to the presence of smoke or heat. For this purpose the coil of relay R2 is connected in series with the emitter-collector circuit of a transistor TR-1, between terminals P2 and P1 so that when the current is permitted to flow in the emitter-collector circuit in a manner to appear hereinafter the coil of relay R2 is energized. Relay R2 is provided with a first set of contacts R2C1 which are normally open and connected between the relay and the transformer T2, to create a holding circuit to the relay when it is energized in a manner to appear hereinafter, and a second set of contacts R2C2 which are normally open, and are connected to an external alarm device.

The operation of the control panel circuit is as follows: when the resistance of a cell C2 has dropped due to the presence of smoke at a detector unit, as previously described, a conductive path is created between terminals D2 and D3 and hence between terminals P2 and P3 so that a circuit is created from one lead of the secondary of transformer T2 through the cell C2 and through the limiting resistor R1 to the opposite pole of transformer T2. The base of transistor TR–1, connected to resistor R1 thereby becomes more negative, permitting current flow in the collector emitter circuit, which circuit includes the coil of relay R2. Contacts R2C1 thereby close, creating a holding circuit to the relay coil from the secondary of transformer T2, and contacts R2C2 also close to actuate the external alarm. Whenever appropriate, the panel circuit may be reset (assuming that the smoke condition has been corrected and the cell resistance has again risen to its normal value) by opening re-set switch S1, breaking the circuit to the coil of relay R2. Switch S2 may also be provided for test purposes, to enanble a test signal to be applied to the base of transistor TR–1.

In such an installation, for complete reliability, it is necessary to provide a trouble detecting circuit for monitoring the condition of the bulb B1, the operativeness of transformers T1 and T2, the wiring of the bulb power circuit between the panel and the detection units, the wiring to the detector cells, and the operativeness of the trouble detecting circuit itself.

In the illustrated embodiment the trouble relay R3 and the contacts R1C1 of each relay R1 in each detector unit are connected in series, and are normally energized from transformer T3. The relay R3 is provided with normally open contacts, R3C1, so that if the circuit to the coil of relay R3 is broken in any manner, the contacts R3C1 close to actuate an external alarm.

Hence any failure of the main transformer T2 or the power wiring therefrom will cause all of the relays R2 in the detector units to drop out, breaking the circuit to trouble relay R3. Similarly, any failure of a bulb B1 or a transformer T1 in a detector unit will cause the relay R1 in that unit to drop out, breaking the circuit to the trouble relay R3, since all the relays R1 are in series with the trouble relay R3.

The trouble circuit is self monitoring, since any failure of the transformer T3 or the wiring of the trouble circuit will cause relay R3 to drop out, actuating the trouble alarm.

The detector cell C2 is connected between terminals D2 and D3 and hence the circuit thereto is passed to the control panel over one wire of the power supply through terminal P2 and one wire of the trouble circuit through terminal P3, and hence one wire of the circuit to the detector cell is monitored as part of the power supply to the bulb B1 and the other wire of the circuit to the detector cell is monitored as part of the power supply to the trouble relay R3.

The illustrated detector system therefore eliminates the need for complicated and expensive apparatus for checking the continuity of lead wires between the control panel and the detector cell, and also eliminates the need for the two lead wires which would otherwise be needed to connect the detector cell to the control panel.

Since certain obvious changes may be made in the illustrated detector system without departing from the scope of the invention, it is intended that all matter contained herein be interpreted in an illustrative and not a limiting sense.

I claim:

1. In a photo-electric detector system which includes a light source and a normally dark photo-resistive cell responsive to reflected light from objects in the beam from the light source to cause a decrease in resistance of said cell, means for supplying power to the light source through a first pair of terminals, means responsive to the energization of the light source to complete a circuit between a second pair of terminals and means also connected to said second pair of terminals to actuate a first alarm when the circuit between said second pair of terminals is broken, the improvement comprising means connecting the photo-resistive cell to one terminal of the first pair and one terminal of the second pair, and means responsive to a drop in resistance between said one terminal of the first pair and one terminal of the second pair to actuate a second alarm.

2. In a photo-electric detector system in which a plurality of detector units are each provided with a light source and a normally dark photo-resistive cell responsive to reflected light from objects in the beam from the light source to cause a decrease in resistance of the associated cell, said system including means for supplying power to the light sources in parallel through a first pair of terminals, and means responsive to the energization of each light source to complete a circuit between a second pair of terminals, the second pairs of terminals being connected in a series circuit through said second pairs of terminals and through means for controlling a first alarm, said means for controlling a first alarm being responsive to the interruption of said series circuit to energize said first alarm, the improvement comprising means connecting the photo-resistive cell of each unit between one terminal of the first pair and one terminal of the second pair and means responsive to a drop in resistance between said one terminal of the first pair and one terminal of the second pair for actuating a second alarm.

3. A particle detector system, comprising a plurality of detector units and a control unit, each of said detector units comprising a housing forming a dark chamber, means permitting a fluid to enter the chamber, a normally energized light source projecting a beam of light into the chamber whereby particles entering said housing are illuminated by said beam, the light sources of the detector units being connected in parallel and being energized through a pair of power leads from the control unit, said detector unit including a photo-resistive cell viewing the light beam so that the cell is illuminated by reflected light from said particles when present in the housing, means associated with each light source responsive to the energization thereof to complete a circuit between a pair of terminals, said terminals of the detector units being connected to establish a series circuit therethrough and through alarm control means in the control unit, said alarm control means being responsive to the breaking of said series circuit to energize a first alarm, means in the control unit responsive to a drop in resistance between one power lead and a terminal of the series circuit to actuate a second alarm, and means in each detector unit responsive to the illumination of said cell by particles entering the housing to cause a drop in resistance between one of said power leads and one of said terminals of the series circuit.

References Cited

UNITED STATES PATENTS

| | | | |
|---|---|---|---|
| 2,474,221 | 6/1949 | Cahusac | 340—237 |
| 2,537,028 | 1/1951 | Cahusac et al. | 340—237 |
| 2,664,559 | 12/1953 | Sierer et al. | 340—228 |
| 2,699,538 | 1/1955 | Nickel | 340—237 |
| 2,939,054 | 5/1960 | Caruso et al. | 340—256 X |

FOREIGN PATENTS

| | | |
|---|---|---|
| 398,722 | 9/1933 | Great Britain. |

NEIL C. READ, *Primary Examiner.*

D. MYER, *Assistant Examiner.*